United States Patent
Sakiyama et al.

(10) Patent No.: US 12,123,080 B2
(45) Date of Patent: Oct. 22, 2024

(54) STEEL SHEET

(71) Applicant: NIPPON STEEL CORPORATION, Tokyo (JP)

(72) Inventors: Yuji Sakiyama, Tokyo (JP); Takashi Yasutomi, Tokyo (JP); Katsuya Nakano, Tokyo (JP); Yoshiaki Honda, Tokyo (JP); Masahiro Nakata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 81 days.

(21) Appl. No.: 18/008,639

(22) PCT Filed: Aug. 6, 2021

(86) PCT No.: PCT/JP2021/029436
§ 371 (c)(1),
(2) Date: Dec. 6, 2022

(87) PCT Pub. No.: WO2022/030639
PCT Pub. Date: Feb. 10, 2022

(65) Prior Publication Data
US 2023/0250521 A1 Aug. 10, 2023

(30) Foreign Application Priority Data
Aug. 7, 2020 (JP) .................. 2020-134502

(51) Int. Cl.
*C22C 38/02* (2006.01)
*B32B 15/01* (2006.01)
(Continued)

(52) U.S. Cl.
CPC ............ *C22C 38/02* (2013.01); *B32B 15/011* (2013.01); *C22C 38/001* (2013.01); *C22C 38/04* (2013.01);
(Continued)

(58) Field of Classification Search
CPC ... B32B 15/011; B32B 2307/536; B32B 7/02; B32B 7/22
See application file for complete search history.

(56) References Cited

U.S. PATENT DOCUMENTS

| | | |
|---|---|---|
| 2020/0017932 A1 | 1/2020 | Takeda et al. |
| 2020/0232058 A1 | 7/2020 | Takeda et al. |
| 2020/0232060 A1 | 7/2020 | Nakano et al. |

FOREIGN PATENT DOCUMENTS

| | | |
|---|---|---|
| EP | 3 584 344 A1 | 12/2019 |
| EP | 3 584 348 A1 | 12/2019 |

(Continued)

OTHER PUBLICATIONS

English translation of Hashimoto, JP3790087, obtained form EPO espacenet Jun. 6, 2024. (Year: 2024).*

*Primary Examiner* — Adam Krupicka
(74) *Attorney, Agent, or Firm* — Birch, Stewart, Kolasch & Birch, LLP

(57) ABSTRACT

Provided is a steel sheet comprising a sheet thickness center part and a first surface layer part and a second surface layer part respectively arranged at two sides of the sheet thickness center part, wherein the first surface layer part and second surface layer part respectively independently have thicknesses of more than 10 μm to 30% or less of the sheet thickness, the first surface layer part and second surface layer part have average Vickers hardnesses different from the average Vickers hardness of a sheet thickness ½ position, and a first hardness cumulative value at a region from a surface of the first surface layer part side to 30% of the sheet thickness is 1.05 times or more of a second hardness cumulative value at a region from a surface of the second surface layer part side to 30% of the sheet thickness.

20 Claims, 3 Drawing Sheets

(51) Int. Cl.
   *C22C 38/00*   (2006.01)
   *C22C 38/04*   (2006.01)
   *C22C 38/06*   (2006.01)
   *C22C 38/22*   (2006.01)
   *C22C 38/32*   (2006.01)
   *C22C 38/42*   (2006.01)
   *C22C 38/46*   (2006.01)
   *C22C 38/48*   (2006.01)
   *C22C 38/60*   (2006.01)

(52) U.S. Cl.
   CPC .............. *C22C 38/06* (2013.01); *C22C 38/22* (2013.01); *C22C 38/32* (2013.01); *C22C 38/42* (2013.01); *C22C 38/46* (2013.01); *C22C 38/48* (2013.01); *C22C 38/60* (2013.01); *B32B 2307/536* (2013.01); *B32B 2307/54* (2013.01); *B32B 2311/30* (2013.01)

(56) References Cited

FOREIGN PATENT DOCUMENTS

| | | |
|---|---|---|
| EP | 4 194 571 A1 | 6/2023 |
| JP | 3790087 B2 * | 6/2006 |
| WO | WO 2018/151331 A1 | 8/2018 |

* cited by examiner

STEEL SHEET

FIELD

The present invention relates to a steel sheet.

BACKGROUND

Steel sheet is generally assembled into various structures and supplied to their respective applications through cutting, bending, and other working steps, welding and other joining steps, and coating and other finishing steps. In the working steps, according to the working operations, various stresses may act upon the steel sheet or the quality of the steel sheet may change. Due to these, sometimes cracking or embrittlement occur. Therefore, steel sheet is generally required to have excellent characteristics for the specific working operations applied.

PTL 1 describes tensile strength 800 MPa or more high strength steel sheet comprising a sheet thickness center part and a surface layer softened part arranged on one side or both sides of the sheet thickness center part, wherein each surface layer softened part has a thickness of from more than 10 μm to 30% or less of the sheet thickness, an average Vickers hardness of each surface layer softened part is 0.60 time or less the average Vickers hardness of a sheet thickness ½ position, and a standard deviation of nanohardness of each surface layer softened part is 0.8 or less. Further, PTL 1 teaches that the bendability is improved by providing the surface layer softened part on one side or both sides of the steel sheet and suppressing variation in the microhardness of each surface layer softened part.

CITATIONS LIST

Patent Literature

[PTL 1] WO2018/151331

SUMMARY

Technical Problem

For working steel sheet, in addition to the bending such as described in PTL 1, there is also cutting, etc. As a specific example of the cutting, typically shearing is known. In shearing of steel sheet, in general, the steel sheet workpiece is placed between a punch and die and these are used to cut the steel sheet by the action of the shear force. In such a work process, sometimes tensile residual stress is caused at the sheared edge of the steel sheet. There is the problem that if the tensile residual stress becomes greater, the risk will rise of hydrogen embrittlement cracking occurring due to the hydrogen penetrating the steel from the outside environment.

The present invention was made in consideration of such a situation, and an object of the present invention is to provide a steel sheet able to reduce tensile residual stress occurring at a sheared edge at the time of shearing by a novel constitution.

Solution to Problem

To achieve the above object, the inventors studied the constitution of a steel sheet able to reduce the tensile residual stress occurring at a sheared edge at the time of shearing. As a result, the inventors discovered that by providing the two sides of steel sheet with surface layer parts having hardnesses different from the sheet thickness center part of the steel sheet and further providing a difference in hardness at the two sides of the steel sheet, it is possible to reduce the tensile residual stress occurring at the sheared edge, and thereby completed the present invention.

The steel sheet for achieving the above object is as follows:

[1] A steel sheet comprising a sheet thickness center part and a first surface layer part and a second surface layer part respectively arranged at two sides of the sheet thickness center part, wherein
  the first surface layer part and second surface layer part respectively independently have thicknesses of more than 10 μm to 30% or less of the sheet thickness,
  the first surface layer part and second surface layer part have average Vickers hardnesses different from the average Vickers hardness of a sheet thickness ½ position, and
  a first hardness cumulative value at a region from a surface of the first surface layer part side to 30% of the sheet thickness is 1.05 times or more of a second hardness cumulative value at a region from a surface of the second surface layer part side to 30% of the sheet thickness.

[2] The steel sheet according to [1], wherein a ratio P ($H_{high}/H_{low}$) of a hardness cumulative value $H_{high}$ at a region from a surface of the first surface layer part side to X % of the sheet thickness and a hardness cumulative value $H_{low}$ at a region from a surface of the second surface layer part side to X % of the sheet thickness satisfies the following formula 1:

$$P \geq 0.00035(X-30)^2 + 1.05 \qquad \text{formula 1}$$

where, $0 < X \leq 30$.

[3] The steel sheet according to [1] or [2], wherein the first hardness cumulative value is 1.20 times or more of the second hardness cumulative value.

[4] The steel sheet according to any one of [1] to [3], wherein the first surface layer part and second surface layer part have average Vickers hardnesses lower than the average Vickers hardness of the sheet thickness ½ position.

[5] The steel sheet according to any one of [1] to [3], wherein the first surface layer part and second surface layer part have average Vickers hardnesses higher than the average Vickers hardness of the sheet thickness ½ position.

[6] The steel sheet according to any one of [1] to [5], wherein the tensile strength is 980 MPa or more.

[7] The steel sheet according to [6], wherein the tensile strength is 1470 MPa or more.

[8] The steel sheet according to any one of [1] to [7], wherein the sheet thickness center part has a chemical composition comprising, by mass %,
  C: 0.050 to 0.800%,
  Si: 0.01 to 3.00%,
  Mn: 0.01 to 10.00%,
  Al: 0.001 to 0.500%,
  P: 0.100% or less,
  S: 0.050% or less,
  N: 0.0100% or less,
  Cr: 0 to 3.000%,
  Mo: 0 to 1.000%,
  B: 0 to 0.0100%,
  Ti: 0 to 0.500%,
  Nb: 0 to 0.500%,
  V: 0 to 0.500%,
  Cu: 0 to 0.500%, Ni: 0 to 0.500%,
O: 0 to 0.0200%,
W: 0 to 0.100%,
Ta: 0 to 0.100%,
Co: 0 to 0.500%,
Sn: 0 to 0.050%,
Sb: 0 to 0.050%,
As: 0 to 0.050%,
Mg: 0 to 0.0500%,
Ca: 0 to 0.050%,
Y: 0 to 0.050%,
Zr: 0 to 0.050%,
La: 0 to 0.050%,
Ce: 0 to 0.050%, and
balance: Fe and impurities.

[9] The steel sheet according to [8], wherein the chemical composition comprises, by mass %, at least one selected from the group consisting of:

Cr: 0.001 to 3.000%,
Mo: 0.001 to 1.000%,
B: 0.0001 to 0.0100%,
Ti: 0.001 to 0.500%,
Nb: 0.001 to 0.500%,
V: 0.001 to 0.500%,
Cu: 0.001 to 0.500%,
Ni: 0.001 to 0.500%,
O: 0.0001 to 0.0200%,
W: 0.001 to 0.100%,
Ta: 0.001 to 0.100%,
Co: 0.001 to 0.500%,
Sn: 0.001 to 0.050%,
Sb: 0.001 to 0.050%,
As: 0.001 to 0.050%,
Mg: 0.0001 to 0.0500%,
Ca: 0.001 to 0.050%,
Y: 0.001 to 0.050%,
Zr: 0.001 to 0.050%,
La: 0.001 to 0.050%, and
Ce: 0.001 to 0.050%.

Advantageous Effects of Invention

According to the present invention, it is possible to provide a steel sheet able to reduce tensile residual stress occurring at a sheared edge at the time of shearing.

DESCRIPTION OF EMBODIMENTS

<Steel Sheet>

The steel sheet according to an embodiment of the present invention comprises a sheet thickness center part and a first surface layer part and a second surface layer part respectively arranged at two sides of the sheet thickness center part, wherein the first surface layer part and second surface layer part respectively independently have thicknesses of more than 10 μm to 30% or less of the sheet thickness, the first surface layer part and second surface layer part have average Vickers hardnesses different from the average Vickers hardness of a sheet thickness ½ position, and a first hardness cumulative value at a region from a surface of the first surface layer part side to 30% of the sheet thickness is 1.05 times or more of a second hardness cumulative value at a region from a surface of the second surface layer part side to 30% of the sheet thickness.

Figure 1:
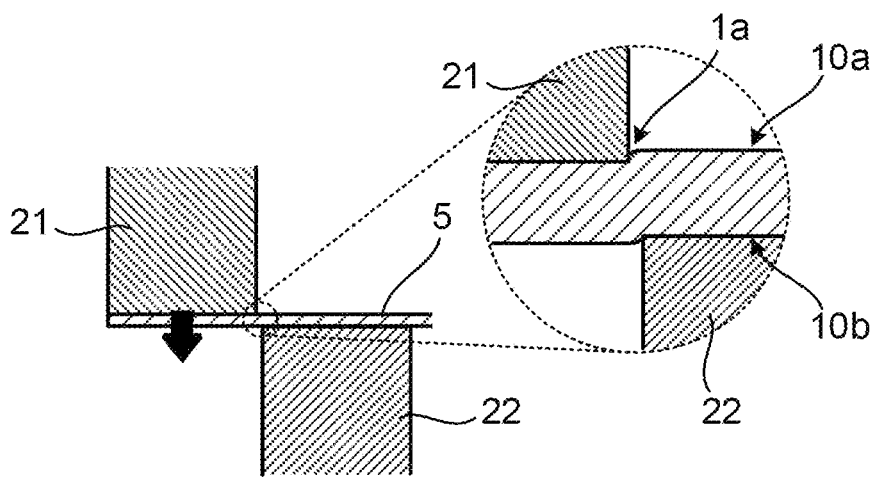
FIG. 1 is a schematic view for explaining one example of a mechanism of formation of a sheared edge in the case of shearing a steel sheet.
Figure 1:
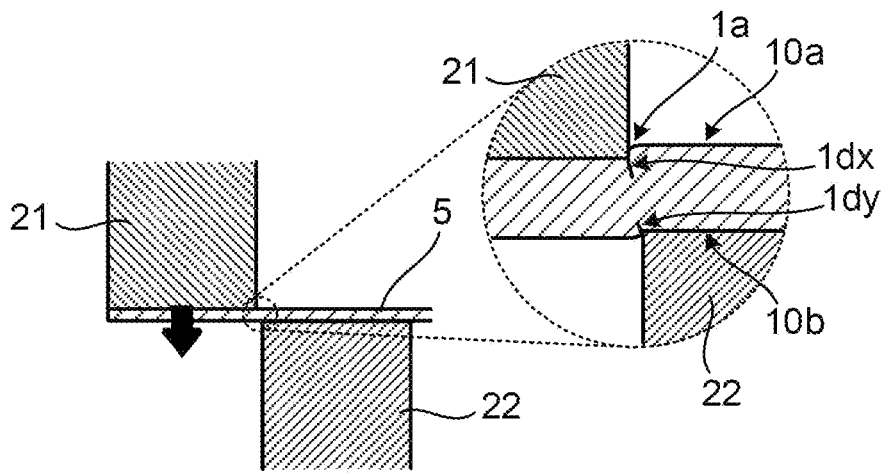
Figure 1:
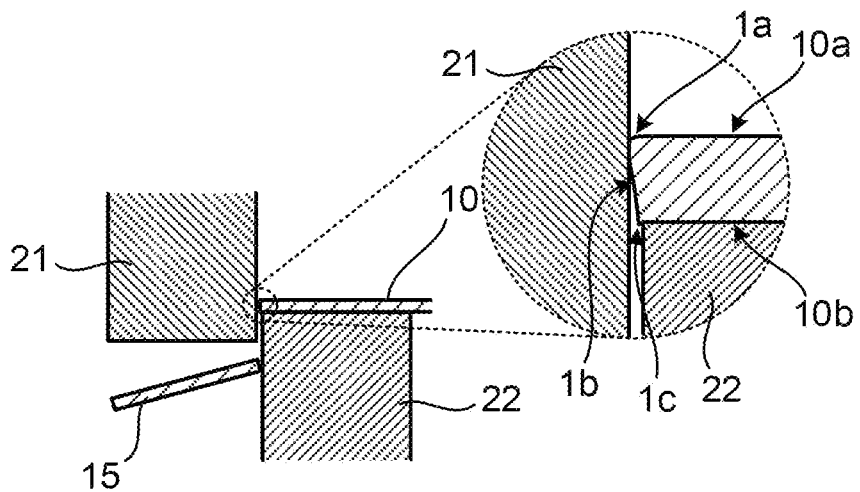

FIG. 1 is a schematic view for explaining one example of a mechanism of formation of a sheared edge in the case of shearing a steel sheet. In shearing of a steel sheet, generally, as shown in FIG. 1(A), a first surface 10a of a workpiece comprised of the steel sheet 5 is pressed by a cutting edge of a first blade 21 (for example, a punch). In the process until the cutting edge of the first blade 21 cuts into the steel sheet 5, a droop 1a is formed on the first surface 10a side. Next, in the process of the cutting edge of the first blade 21 cutting into the steel sheet 5, the sheared surface 1e (see FIG. 3) is formed. After the droop 1a and the sheared surface 1e are formed, as shown in FIG. 1(B), the first crack 1dx is generated from the first blade 21 side toward the second blade 22 (for example the die) side. On the other hand, at the second blade 22 side as well, in the same way, the second surface 10b of the steel sheet 5 is cut into by the cutting edge of the second blade 22, whereby the second crack 1dy is generated from the second blade 22 side toward the first blade 21 side. Finally, as shown in FIG. 1(C), the first crack 1dx and the second crack 1dy grow and merge with each other, whereupon the fracture surface 1b is formed. Further, by making the first blade 21 and the second blade 22 further move, the steel sheet 5 is separated into scrap 15 and the target product workpiece 10. At that time, as shown in FIG. 1(C), in the sheared edge 1 of the workpiece 10, a burr 1c is generally formed at the edge at the second blade 22 side.

In the sheared edge 1 formed in the above way, due to the damage and warping, etc., caused by the shearing, compressive residual stress and tensile residual stress can be formed. If there is a large tensile residual stress at the sheared edge 1, sometimes the hydrogen embrittlement resistance of the sheared edge 1 falls and hydrogen embrittlement cracking occurs. "Hydrogen embrittlement cracking" means the phenomenon of a steel member suddenly fracturing due to hydrogen penetrating the steel from the outside environment and is also referred to as delayed fracture, etc. Hydrogen embrittlement cracking generally easily occurs at locations where stress concentrates, in particular is known to easily occur at a location where tensile residual stress is present. Further, in shearing, generally, in the sheared edge 1, the highest tensile strength tends to occur at the fracture surface 1b. Therefore, to avoid in advance the problem of hydrogen embrittlement cracking due to shearing, it is important in particular to reduce the tensile residual stress occurring at the fracture surface 1b in the tensile residual stress occurring at the sheared edge 1.

In relation to this, the inventors engaged in numerous experiments and analyses repeatedly regarding the relationship between the conditions of shearing of the steel sheet 5 and the properties of the sheared edge 1 formed by the shearing and as a result obtained the following new discovery.

Figure 2:
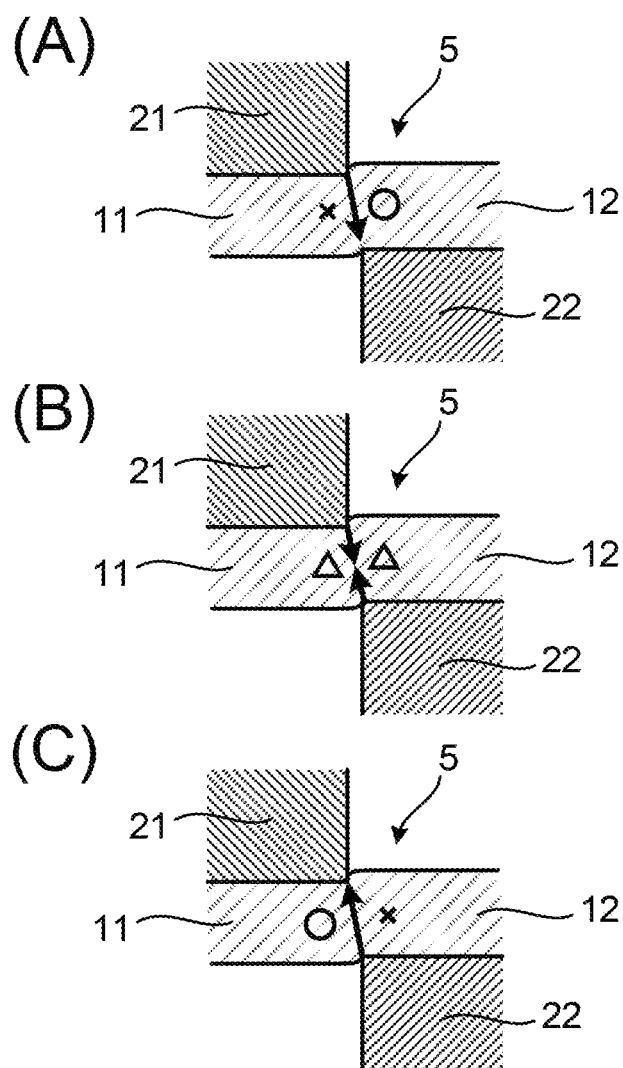
FIG. 2 is a schematic view for explaining a new discovery obtained by the inventors, wherein (A) shows a case of causing the growth of a crack from a first blade, (B) shows a case of causing growth of a crack from both of a first blade and second blade, and (C) shows a case of causing growth of a crack from a second blade.

FIG. 2 is a schematic view for explaining a new discovery obtained by the inventors. In the figure, "◯" means a small tensile residual stress, "△" means a medium extent tensile residual stress, and "×" means a large tensile residual stress. As shown in FIG. 2(A) to (C), the case of stamping one part 11 of the steel sheet 5 by the first blade 21 and stamping another part 12 of the steel sheet 5 by the second blade 22 will be explained. In this case, as shown in FIG. 2(A), if a crack preferentially grows from the first blade 21 side, the tensile residual stress at the sheared edge of the one part 11 becomes larger. On the other hand, the tensile residual stress at the sheared edge of the other part 12 becomes smaller. In other words, the one part 11 can be made scrap 15, while the other part 12 can be suitably employed as the product (workpiece 10). Further, as shown in FIG. 2(B), if cracks equivalently grow from both the first blade 21 side and the second blade 22 side, equivalent tensile residual stress can be generated at the sheared edges of both of the one part 11 and other part 12. In other words, variation of characteristics at the one part 11 and the other part 12 can be suppressed. Therefore, it can be said to be suitable when employing both the one part 11 and other part 12 as the product. Furthermore, as shown in FIG. 2(C), if a crack preferentially grows from the second blade 22 side, the tensile residual stress at the sheared edge of the other part 12 becomes larger. On the other hand, the tensile residual stress at the sheared edge of the one part 11 becomes smaller. In other words, the other part 12 can be made scrap 15, while the one part 11 can be suitably employed as the product (workpiece 10).

Figure 3:
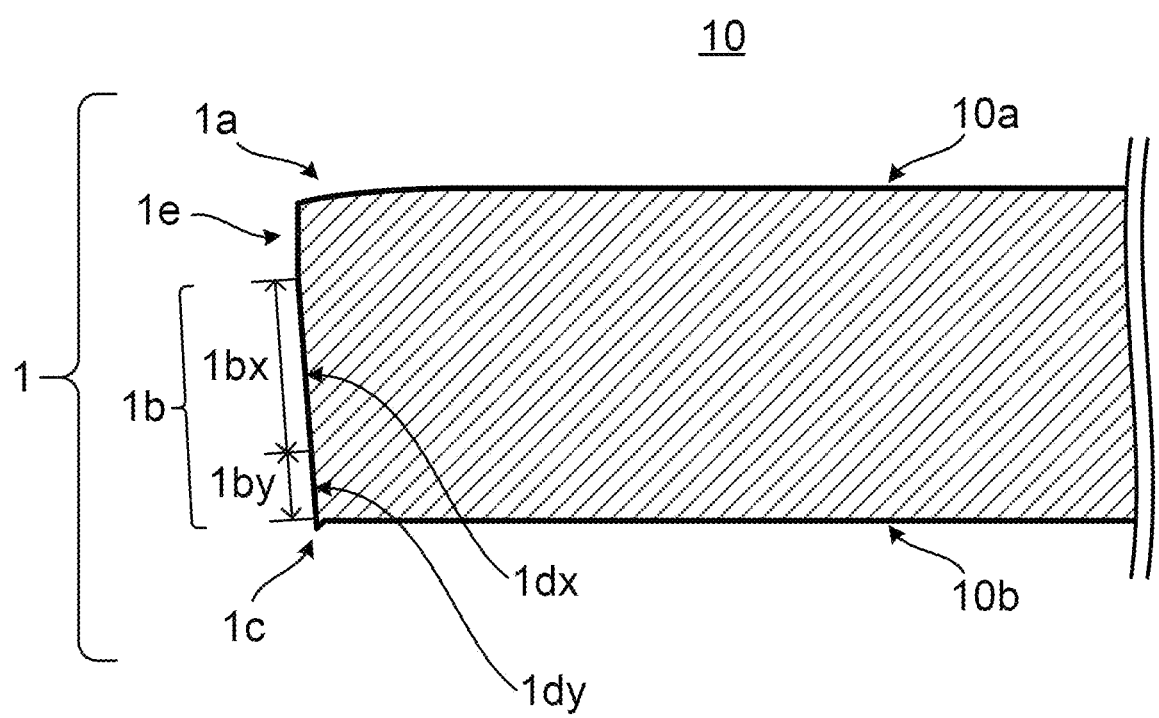
FIG. 3 is a schematic enlarged view showing one example of a sheared edge part of a workpiece corresponding to FIG. 2(A).

FIG. 3 is a schematic enlarged view showing one example of the sheared edge 1 part of the workpiece 10 (other part 12) corresponding to FIG. 2(A). Referring to FIG. 3, the droop 1*a*, the fracture surface 1*b*, the burr 1*c*, and the sheared surface 1*e* are formed on the sheared edge 1. The fracture surface 1*b* includes a first part 1*bx* and a second part 1*by*. The first part 1*bx* is formed by the first crack 1*dx* growing from the droop 1*a* side to the burr 1*c* side, while the second part 1*by* is formed by the second crack 1*dy* proceeding from the burr 1*c* side to the droop 1*a* side. At the sheared edge 1 of FIG. 3, due in part to the preferential crack growth from the first blade 21 side, the area ratio of the first part 1*bx* in the fracture surface 1*b* becomes larger than the area ratio of the second part 1*by* in the fracture surface 1*b*.

From the above, the following (1) to (3) can be said:
(1) In the sheared edge 1, the tensile residual stress occurring at the fracture surface 1*b* changes depending on the directions of growth and lengths of the cracks 1*dx*, 1*dy* forming the fracture surface 1*b*.
(2) At the fracture surface 1*b*, the longer the crack 1*dx* growing from the droop 1*a* side, the smaller the tensile residual stress of the fracture surface 1*b* of the workpiece 10 and the larger the tensile residual stress of the fracture surface of the scrap 15.
(3) In other words, if, at the fracture surface 1*b* of the workpiece 10, the area ratio of the part derived from the first crack 1*dx* growing from the droop 1*a* side is larger than the area ratio of the part derived from the second crack 1*dy* growing from the burr 1*c* side, compared with when the area ratio of the part derived from the first crack 1*dx* growing from the droop 1*a* side is smaller than the area ratio of the part derived from the second crack 1*dy* growing from the burr 1*c* side, it is possible to relatively reduce the tensile residual stress of the fracture surface 1*b*.

Based on the discoveries of the above (1) to (3), the inventors further studied the configuration of a steel sheet 5 able to reduce the tensile residual stress occurring at the sheared edge 1 of the workpiece 10, in particular, the fracture surface 1*b*, obtained by preferentially growing the crack from the first surface 10*a* of the steel sheet 5 corresponding to the first blade 21 (generally, the punch) side. As a result, the inventors discovered that by providing a first surface layer part (for example the first surface 10*a* side) and a second surface layer part (for example the second surface 10*b* side) having different hardnesses from the sheet thickness center part of the steel sheet 5 at the two sides of the steel sheet 5 and further providing a difference in hardness at the two sides of the steel sheet 5, more specifically by making the first hardness cumulative value at the region from the surface of the first surface layer part side to 30% of the sheet thickness 1.05 times or more of the second hardness cumulative value at the region from the surface of the second surface layer part side to 30% of the sheet thickness, it is possible to preferentially grow a crack from the first surface layer part side with a relatively large hardness when shearing the steel sheet 5 and thereby possible to remarkably reduce the tensile residual stress occurring at the sheared edge 1 of the workpiece 10 (steel sheet 5), in particular the fracture surface 1*b*. Therefore, according to the steel sheet of the present invention, it becomes possible to remarkably improve the hydrogen embrittlement resistance of the sheared edge at the workpiece obtained by the shearing.

Below, steel sheets according to embodiments of the present invention will be explained in detail, but the explanation of these is intended to just illustrate preferred embodiments of the present invention and is not intended to limit the present invention to such specific embodiments.

(First Surface Layer Part and Second Surface Layer Part)

According to this embodiment of the present invention, the first surface layer part and the second surface layer part respectively independently have thicknesses of more than 10 μm to 30% or less of the sheet thickness and have average Vickers hardnesses different from the average Vickers hardness of the sheet thickness ½ position. By having thicknesses of more than 10 μm to 30% or less of the sheet thickness, it is possible to sufficiently obtain the effect of provision of surface layer parts at the two sides of the steel sheet. So long as satisfying the requirement, explained later in detail, of the first hardness cumulative value being 1.05 times or more of the second hardness cumulative value, the thicknesses of the first surface layer part and the second surface layer part may respectively be any values in ranges from more than 10 μm to 30% or less of the sheet thickness. The values of the two may be the same or may be different. For example, the thicknesses of the first surface layer part and second surface layer part may respectively independently be 15 μm or more, 30 μm or more, 50 μm or more, 100 μm or more, 150 μm or more, or 200 μm or more and/or may be 25% or less, 20% or less, 15% or less, or 10% or less of the sheet thickness. If illustrating the upper limits not by ratios with respect to the sheet thickness, but by specific thicknesses, for example, the thicknesses of the first surface layer part and second surface layer part may respectively independently be 1800 μm or less, 1200 μm or less, 800 μm or less, 600 μm or less, 500 μm or less, 470 μm or less, 450 μm or less, 430 μm or less, 400 μm or less, 350 μm or less, or 300 μm or less. If the thickness of the first surface layer part and the thickness of the second surface layer part differ, the absolute value of the difference between the thickness of the first surface layer part and the thickness of the second surface layer part may be 5 µm or more, 10 µm or more, 20 µm or more, 30 µm or more, 40 µm or more, or 50 µm or more and/or may be 400 µm or less, 300 µm or less, 200 µm or less, 150 µm or less, or 100 µm or less. For example, even if the first surface layer part and the second surface layer part have the same chemical compositions and same average Vickers hardnesses, by providing a suitable difference to the thicknesses of the same, it becomes possible to relatively easily control the hardness cumulative value of the first surface layer part side of the steel sheet to become 1.05 times or more of the hardness cumulative value of the second surface layer part side. Therefore, from the viewpoint of streamlining the process of production of the steel sheet, the thicknesses of the first surface layer part and the second surface layer part preferably differ. For example, in an embodiment where the average Vickers hardnesses of the first surface layer part and second surface layer part are lower than the average Vickers hardness of the sheet thickness ½ position, the thicker the first surface layer part and second surface layer part, the more the strength of the steel sheet tends to fall, but hydrogen embrittlement cracking generally becomes harder to occur. Therefore, the thicknesses of the first surface layer part and the second surface layer part are preferably suitably selected in the ranges of more than 10 µm to 30% or less of the sheet thickness considering the relationship with the sheet thickness center part, the balance of the strength and hydrogen embrittlement resistance of the steel sheet, etc.

Similarly, so long as satisfying the requirement that the first hardness cumulative value be 1.05 times or more of the second hardness cumulative value, the average Vickers hardnesses of the first surface layer part and the second surface layer part may respectively be any average Vickers hardnesses different from the average Vickers hardness of the sheet thickness ½ position, i.e., may be lower than or may be higher than the average Vickers hardness of the sheet thickness ½ position. From the viewpoint of improving the bendability of the steel sheet, the average Vickers hardnesses of the first surface layer part and the second surface layer part are preferably lower than the average Vickers hardness of the sheet thickness ½ position. On the other hand, from the viewpoint of improving the wear resistance and fatigue characteristics of the steel sheet, the average Vickers hardnesses of the first surface layer part and the second surface layer part are preferably higher than the average Vickers hardness of the sheet thickness ½ position. Furthermore, the average Vickers hardness of the first surface layer part may be higher than the average Vickers hardness of the sheet thickness ½ position, and the average Vickers hardness of the second surface layer part may be lower than the average Vickers hardness of the sheet thickness ½ position. For example, the average Vickers hardnesses of the first surface layer part and the second surface layer part may respectively independently be 0.90 time or less, 0.80 time or less, or 0.60 time or less of the average Vickers hardness of the sheet thickness ½ position and/or may be 1.10 times or more, 1.20 times or more, or 1.40 times or more of the average Vickers hardness of the sheet thickness ½ position. Further, so long as satisfying the requirement of the first hardness cumulative value being 1.05 times or more of the second hardness cumulative value and being different from the average Vickers hardness of the sheet thickness ½ position, the average Vickers hardnesses of the first surface layer part and the second surface layer part may be the same or may be different.

In the present invention, the thicknesses of the first surface layer part and the second surface layer part are determined by an optical microscope. The sample being measured is buried in a diameter 30 mm cylindrical epoxy resin, roughly polished by wet polishing using #80 to 1000 polishing paper, then polished to a mirror finish using a diamond polishing agent having average particle sizes of 3 µm and 1 µm. The polishing using the diamond abrasive having an average particle size of 1 µm is performed under conditions of application of a load of 1N to 10N and holding for 30 to 600 seconds on a polishing table rotating at a speed of 30 to 120 mpm. There is a difference of hardness between the sheet thickness center part and the surface layer parts, therefore a difference arises in the amount of polishing in polishing using a diamond abrasive having an average particle size of 1 µm. Due to this, a slight step difference arises at the interfaces of the sheet thickness center part and the surface layer parts, therefore by examination using an optical microscope, it is possible to determine the interfaces of the sheet thickness center part and the surface layer parts and their thicknesses and ratios in the sheet thickness. If the step difference obtained by the finish polishing is very small, observation by differential interference of an optical microscope is preferably performed.

The Vickers hardnesses of 10 points are randomly measured by a pressing force of 100 g within the above defined first surface layer part and second surface layer part and the average value of these is calculated to determine the average Vickers hardnesses of the first surface layer part and the second surface layer part. Further, the average Vickers hardnesses of the first surface layer part and second surface layer part determined in this way are compared with the average Vickers hardness of the sheet thickness ½ position obtained by measuring the Vickers hardnesses of a total of 3 points or more, for example, 5 points or 10 points, by a pressing force of 100 g in a direction vertical to the sheet thickness at the sheet thickness ½ position and on a line parallel to the rolling direction.

(First Hardness Cumulative Value Being 1.05 Times or More of Second Hardness Cumulative Value)

According to this embodiment of the present invention, the first hardness cumulative value at the region from the surface of the first surface layer part side to 30% of the sheet thickness is 1.05 times or more of the second hardness cumulative value at the region from the surface of the second surface layer part side to 30% of the sheet thickness. By using steel sheet having such a constitution in shearing, it is possible preferentially grow a crack from the first surface layer part side having the relatively large hardness at the time of shearing and as a result possible to reduce the tensile residual stress occurring at the sheared edge. For example, in the previously explained WO2018/151331, it is taught that to improve the bendability of the high strength steel sheet, a surface layer softened part is arranged at one side or both sides of the sheet thickness center part. However, the technical idea of providing the two sides of the steel sheet with a first surface layer part and a second surface layer part having hardnesses different from the sheet thickness center part of the steel sheet and, furthermore, providing a difference in hardness at the two sides of the steel sheet, more specifically making the first hardness cumulative value at the region from the surface of the first surface layer part side to 30% of the sheet thickness 1.05 times or more of the second hardness cumulative value at the region from the surface of the second surface layer part side to 30% of the sheet thickness, so as to preferentially grow a crack from the relatively large hardness first surface layer part side at the time of shearing and reduce the tensile residual stress occurring at the sheared edge has not existed up to now. This was first discovered by the inventors this time. The ranges of measurement of the first hardness cumulative value and the second hardness cumulative value are independent from the thicknesses of the first surface layer part and second surface layer part (any thicknesses of more than 10 μm to 30% or less of the sheet thickness). Regardless of the thicknesses of the first surface layer part and second surface layer part, they are calculated at the regions from the surfaces of the first surface layer part side and the second surface layer part side to 30% of sheet thickness.

Specifically, in the present invention, the hardness cumulative value means the cumulative value of the Vickers hardnesses at a region from the steel sheet surface (if there is a plating layer present, right below the plating layer or right below the alloy layer between the plating layer and the base material) to 30% of the sheet thickness and is determined in the following way. Specifically explaining the first hardness cumulative value, first, at suitable positions more than 10 μm to 20 μm in range from the surface of the steel sheet at the first surface layer part side to the sheet thickness direction, for example, at certain intervals in the sheet thickness direction (for example, every 5% of sheet thickness, in accordance with need, every 3%, every 2.5%, every 1%, or every 0.5%) from the 15 μm position as the starting point of measurement, the Vickers hardnesses at those sheet thickness direction positions are measured by a pressing load of 100 g, then the Vickers hardnesses of a total of 3 points or more, for example, 5 points or 10 points, are similarly measured by a pressing force of 100 g in a direction vertical to the sheet thickness at those positions and on a line parallel to the rolling direction. The average values of these are made the average Vickers hardnesses at those sheet thickness direction positions. The intervals between the measurement points aligned in the sheet thickness direction and the rolling direction are preferably a distance of 4 times or more of the indentations. A "distance of 4 times or more of the indentations" means a distance of 4 times or more of the length of a diagonal at a rectangular opening of an indentation formed by a diamond indenter when measuring the Vickers hardness. If difficult to make the intervals of the measurement points a distance of 4 times or more of the indentations while striking the surface in the sheet thickness direction in a line, it is also possible to make the intervals of the measurement points a distance of 4 times or more of the indentations and strike the surface in the sheet thickness direction in a zigzag pattern. The first hardness cumulative value (Hv×mm) is determined by adding up the values of the average Vickers hardnesses at the sheet thickness direction positions obtained in the above way by measurement from the surface of the first surface layer part side to 30% of the sheet thickness multiplied with the measurement intervals (meaning distance parallel to sheet thickness direction between measurement points from surface to 30% of sheet thickness, for example, in case of measurement start point, corresponding to distance parallel to sheet thickness direction from surface to measurement start point). Similarly, the second hardness cumulative value (Hv×mm) is determined by adding up the values of the average Vickers hardnesses at the sheet thickness direction positions obtained by measurement from the surface of the second surface layer part side to 30% of the sheet thickness multiplied with the measurement intervals.

From the viewpoint of reliably preferentially growing a crack from the first surface layer part side, the larger the difference between the first hardness cumulative value and the second hardness cumulative value (ratio of first hardness cumulative value/second hardness cumulative value), the better. Therefore, the first hardness cumulative value is preferably 1.06 times or more or 1.08 times or more of the second hardness cumulative value, more preferably 1.10 times or more, 1.12 times or more, 1.14 times or more, 1.16 times or more, or 1.18 times or more, still more preferably 1.20 times or more, 1.22 times or more, 1.24 times or more, 1.26 times or more, or 1.28 times or more, most preferably 1.30 times or more. The upper limit value is not particularly set, but generally the first hardness cumulative value may be 5.00 times or less of the second hardness cumulative value. For example, it may be 3.00 times or less.

The technique for controlling the first hardness cumulative value and the second hardness cumulative value to the above such relationship is not particularly limited, but, for example, provision of a difference between the chemical composition, microstructure, and/or thickness between the first surface layer part and the second surface layer part may be mentioned. More specifically, it is possible to change the contents of part of the elements of the chemical composition between the first surface layer part and the second surface layer part (for example, the contents of at least one element such as C, Mn, Cr, Mo, B, Cu, Ni, etc., relating in particular to the steel sheet strength) so that the average Vickers hardness of the first surface layer part becomes higher than the average Vickers hardness of the second surface layer part. Alternatively, further, it is also possible to increase the ratio of the hard structures in the first surface layer part (for example, bainite, martensite, etc.) compared with the second surface layer part so as to control the first hardness cumulative value and the second hardness cumulative value to the desired relationship. In place of or in addition to this, it is also possible to provide a difference between the thickness of the first surface layer part and the thickness of the second surface layer part, for example, if the surface layer parts are softer than the sheet thickness center part, make the thickness of the first surface layer part smaller than the thickness of the second surface layer part and, if the surface layer parts are harder than the sheet thickness center part, make the thickness of the first surface layer part greater than the thickness of the second surface layer part so that, similarly, the hardness cumulative value of the first surface layer part side of the finally obtained steel sheet becomes 1.05 times or more of the hardness cumulative value of the second surface layer part side.

(Ratio P of Hardness Cumulative Value $H_{high}$ of First Surface Layer Part Side and Hardness Cumulative Value $H_{low}$ of Second Surface Layer Part Side)

According to a preferable embodiment of the present invention, a ratio P ($H_{high}/H_{low}$) of a hardness cumulative value $H_{high}$ at a region from a surface of the first surface layer part side to X % of the sheet thickness and a hardness cumulative value $H_{low}$ at a region from a surface of the second surface layer part side to X % of the sheet thickness satisfies the following formula 1:

$$P \div 0.00035(X-30)^2 + 1.05 \qquad \text{formula 1}$$

where, $0 < X \leq 30$.

The minimum value of X corresponds to the ratio of the minimum value of the thickness of the surface layer part (more than 10 μm) to the sheet thickness, but that ratio changes in accordance with the value of the sheet thickness, therefore the minimum value of X is more than 0.

By placing a suitable first surface layer part and second surface layer part at the two sides of the sheet thickness center part so that the ratio P ($H_{high}/H_{low}$) satisfies the formula 1, at the parts of the first surface layer part and the second surface layer part close to the surface, the ratio P becomes about 1.36 or a value larger than that, therefore the difference of the first hardness cumulative value and the second hardness cumulative value becomes larger and a crack can more easily form from the first surface layer part side. In addition, by controlling the ratio P so as to satisfy the formula 1, it is possible to make the hardness cumulative value of the first surface layer part side always 1.05 times or more of the hardness cumulative value of the second surface layer part side at the same depth position in the sheet thickness direction of the two sides of the steel sheet, i.e., possible to make the ratio P 1.05 or more at the same depth position in the sheet thickness direction at the two sides of the steel sheet. Therefore, in this case, it becomes possible to make a crack starting from the surface of the first surface layer part stably grow to make the crack preferentially grow from the first surface layer part side more reliably.

The technique for controlling the ratio P to satisfy the formula 1 is not particularly limited, but, for example, placing a first surface layer part and second surface layer part with a ratio of average Vickers hardnesses of about 1.36 or larger and with the same thicknesses at the two sides of a sheet thickness center part, similarly placing a first surface layer part and second surface layer part with a ratio of average Vickers hardnesses of about 1.36 or larger at the two sides of a sheet thickness center part and changing the thicknesses of the first surface layer part and second surface layer part in a range satisfying the formula 1, etc., may be mentioned. In the process of determination of the first hardness cumulative value and the second hardness cumulative value explained above, the average Vickers hardnesses at the sheet thickness direction positions from the surfaces of the first surface layer part side and the second surface layer part side to 30% of the sheet thickness are measured. For this reason, the ratios of the hardness cumulative values at the sheet thickness direction positions at the regions of the first surface layer part side and the second surface layer part side up to 30% of the sheet thickness can be relatively easily calculated. By comparing a curve plotting the calculated ratios of cumulative values with the curve of the formula 1, it is possible to judge if the ratio P satisfies the formula 1.

(Sheet Thickness Center Part and Preferable Chemical Composition of Same)

In this embodiment of the present invention, the sheet thickness center part may be any material with an average Vickers hardness at a position corresponding to the sheet thickness ½ position different from the average Vickers hardnesses of the first surface layer part and the second surface layer part. Therefore, the chemical composition of the sheet thickness center part is not particularly limited and may be any suitable chemical composition. More specifically, the present invention has as its object, as explained above, to provide steel sheet able to reduce tensile residual stress occurring at a sheared edge at the time of shearing and achieves the above object by providing the two sides of steel sheet with a first surface layer part and second surface layer part having hardnesses different from the sheet thickness center part of the steel sheet and further providing a difference in hardness at the two sides of the steel sheet, more specifically controlling the first hardness cumulative value at the region from the surface of the first surface layer part side to 30% of the sheet thickness to become 1.05 times or more of the second hardness cumulative value at the region from the surface of the second surface layer part side to 30% of the sheet thickness. Therefore, the chemical composition of the steel sheet, in particular the chemical composition of the sheet thickness center part and the chemical compositions of the first surface layer part and second surface layer part explained in detail later, clearly are not technical features essential in achieving the object of the present invention. Below, the preferable chemical composition of the sheet thickness center part applied to the steel sheet according to an embodiment of the present invention will be explained in detail, but the explanation of these is just intended as a simple illustration and is not intended to limit the present invention to one using a sheet thickness center part having such a specific chemical composition. Further, sometimes the chemical composition near the interface with the surface layer part at the sheet thickness center part will differ from a position sufficiently separated from the interface due to diffusion of alloy elements with the surface layer part. In such a case, the chemical composition of the sheet thickness center part below will be referred to as "the chemical composition measured near the sheet thickness ½ position". Further, in the following explanation, the "%" of the units of contents of the elements, unless otherwise indicated, shall mean "mass %". Furthermore, in this Description, "to" showing a numerical range, unless otherwise indicated, is used in the sense including the numerical values described before and after it as the upper limit value and lower limit value.

(C: 0.050 to 0.800%)

C is an element effective for raising the strength of steel sheet. Further, C is an element effective for securing hardenability. To sufficiently obtain these effects, the content of C is preferably 0.050% or more. The content of C may also be 0.100% or more, 0.200% or more, or 0.300% or more. On the other hand, if excessively containing C, sometimes the toughness falls. Therefore, the content of C is preferably 0.800% or less. The content of C may also be 0.700% or less, 0.600% or less, or 0.500% or less.

(Si: 0.01 to 3.00%)

Si is an element effective for securing hardenability. Further, Si is an element suppressing the alloying with Al. To sufficiently obtain these effects, the content of Si is preferably 0.01% or more. Further, from the viewpoint of securing ductility, the content of Si may also be 0.30% or more or 0.50% or more. In addition, Si is also an element effective for suppressing coarsening of iron-based carbides at the sheet thickness center part and for raising the strength and formability. Further, Si is also an element contributing to higher strength of the steel sheet by solution strengthening. From these viewpoints, the content of Si may also be 1.00% or more or 1.20% or more. However, if excessively containing Si, sometimes the sheet thickness center part will become brittle and the ductility will deteriorate. For this reason, the content of Si is preferably 3.00%. The content of Si may also be 2.50% or less, 2.20% or less, or 2.00% or less.

(Mn: 0.01 to 10.00%)

Mn is an element effective for raising the strength of steel sheet. Further, Mn is an element effective for securing hardenability. To sufficiently obtain these effects, the content of Mn is preferably 0.01% or more. The content of Mn may also be 0.10% or more, 1.00% or more or 1.50% or more. On the other hand, if excessively containing Mn, sometimes the hardness distribution of the steel sheet surface layer becomes larger due to Mn segregation. Therefore, the content of Mn is preferably 10.00% or less. The content of Mn may also be 8.00% or less, 6.00% or less, or 5.00% or less.

(Al: 0.001 to 0.500%)

Al is an element acting as a deoxidizer. To sufficiently obtain such an effect, the content of Al is preferably 0.001% or more. The content of Al may also be 0.005% or more, 0.010% or more, or 0.050% or more. On the other hand, if excessively containing Al, coarse oxides are formed and the workability and other characteristics are liable to be degraded. Therefore, the content of Al is preferably 0.500% or less. The content of Al may also be 0.400% or less, 0.300% or less, or 0.200% or less.

(P: 0.100% or Less)

P tends to segregate at the sheet thickness center part of steel sheet and, if contained in excess, sometimes causes embrittlement of the weld zone. Therefore, the content of P is preferably 0.100% or less. The content of P may also be 0.080% or less, 0.060% or less, or 0.050% or less. The lower limit of P is not particularly set and may also be 0%, but from the viewpoint of production costs, the content of P may also be more than 0%, 0.001% or more, or 0.005% or more.

(S: 0.050% or Less)

S is an element mixed in at the production process and forming inclusions. If excessively containing S, the toughness and other characteristics are liable to be degraded. Therefore, the content of S is preferably 0.050% or less. The content of S may also be 0.030% or less, 0.010% or less, or 0.005% or less. The lower limit of S is not particularly set and may also be 0%, but from the viewpoint of production costs, the content of S may also be more than 0%, 0.0001% or more, or 0.0005% or more.

(N: 0.0100% or Less)

N, if contained in excess, forms coarse nitrides and sometimes causes the bendability to deteriorate. Therefore, the content of N is preferably 0.0100% or less. In addition, N is preferably small in amount since it sometimes becomes a cause of formation of blowholes at the time of welding. For this reason, the content of N may also be 0.0080% or less, 0.0060% or less, or 0.0030% or less. The lower limit of N is not particularly set and may also be 0%, but from the viewpoint of production costs, the content of N may also be more than 0%, 0.0005% or more, or 0.0010% or more.

The basic chemical composition of the sheet thickness center part according to this embodiment of the present invention is as explained above. Furthermore, the sheet thickness center part may, in accordance with need, also contain at least one element from among any of the following optional elements in place of part of the Fe of the balance. For example, the sheet thickness center part may also contain at least one selected from the group consisting of Cr: 0 to 3.000%, Mo: 0 to 1.000%, and B: 0 to 0.0100%. Further, the sheet thickness center part may also contain at least one selected from the group consisting of Ti: 0 to 0.500%, Nb: 0 to 0.500%, and V: 0 to 0.500%. Further, the sheet thickness center part may also contain Cu: 0 to 0.500%, Ni: 0 to 0.500%, O: 0 to 0.0200%, W: 0 to 0.100%, Ta: 0 to 0.100%, Co: 0 to 0.500%, Sn: 0 to 0.050%, Sb: 0 to 0.050%, As: 0 to 0.050%, Mg: 0 to 0.0500%, Ca: 0 to 0.050%, Y: 0 to 0.050%, Zr: 0 to 0.050%, La: 0 to 0.050%, and Ce: 0 to 0.050%. Below, these optional selective elements will be explained in detail.

(Cr: 0 to 3.000%)

Cr is an element contributing to improvement of strength. Further, Cr is an element improving the hardenability. The content of Cr may be 0%, but to sufficiently obtain these effects, the content of Cr is preferably 0.001% or more. The content of Cr may also be 0.005% or more, 0.010% or more, or 0.100% or more. On the other hand, if excessively containing Cr, the pickling ability, weldability, and/or hot workability, etc., will sometimes deteriorate. For this reason, the content of Cr is preferably 3.000% or less. The content of Cr may also be 2.500% or less, 2.000% or less, or 1.500% or less.

(Mo: 0 to 1.000%)

Mo is an element contributing to improvement of the strength. Further, Mo is an element improving the hardenability. The Mo content may also be 0%, but to sufficiently obtain these effects, the Mo content is preferably 0.001% or more. The content of Mo may also be 0.005% or more, 0.010% or more, or 0.100% or more. On the other hand, if excessively including Mo, sometimes the pickling ability, weldability, and/or hot workability, etc., deteriorate. For this reason, the Mo content is preferably 1.000% or less. The Mo content may also be 0.800% or less, 0.600% or less, or 0.400% or less.

(B: 0 to 0.0100%)

B is an element contributing to improvement of strength. Further, B is an element improving the hardenability. The content of B may be 0%, but to sufficiently obtain these effects, the content of B is preferably 0.0001% or more. The content of B may also be 0.0010% or more, 0.0020% or more, or 0.0030% or more. On the other hand, if excessively containing B, the pickling ability, weldability, and/or hot workability, etc., will sometimes deteriorate. For this reason, the content of B is preferably 0.0100% or less. The content of B may also be 0.0080% or less, 0.0060% or less, or 0.0050% or less.

(Ti: 0 to 0.500%, Nb: 0 to 0.500%, and V: 0 to 0.500%)

Ti, Nb, and V are strengthening elements and improve the strength through formation of carbides. Further, Ti, Nb, and V are elements contributing to refinement by the pinning effect and are also elements lowering the rate of diffusion of Fe due to their presence in a solid solution state. The contents of Ti, Nb, and V may be 0%, but to sufficiently obtain these effects, the contents of Ti, Nb, and V are preferably 0.001% or more. The contents of Ti, Nb, and V may also be 0.005% or more, 0.010% or more, or 0.100% or more. On the other hand, if excessively containing Ti, Nb, and V, carbides coarsen and cause the formability and other characteristics to deteriorate. Therefore, the contents of Ti, Nb, and V are preferably 0.500% or less. The contents of Ti, Nb, and V may also be 0.400% or less, 0.300% or less, or 0.200% or less.

(Cu: 0 to 0.500% and Ni: 0 to 0.500%)

Cu and Ni are elements contributing to improvement of strength. The contents of Cu and Ni may be 0%, but to sufficiently obtain such an effect, the contents of Cu and Ni are preferably 0.001% or more. The contents of Cu and Ni may also be 0.005% or more, 0.010% or more, or 0.100% or more. On the other hand, if excessively containing Cu and Ni, the pickling ability, weldability, and/or hot workability, etc., will sometimes deteriorate. For this reason, the contents of Cu and Ni are preferably 0.500% or less. The contents of Cu and Ni may also be 0.400% or less, 0.300% or less, or 0.200% or less.

(Others)

Furthermore, the sheet thickness center part may intentionally or unavoidably contain the following elements. The effects of the present invention are not obstructed by the same. These elements are O: 0 to 0.0200%, W: 0 to 0.100%, Ta: 0 to 0.100%, Co: 0 to 0.500%, Sn: 0 to 0.050%, Sb: 0 to 0.050%, As: 0 to 0.050%, Mg: 0 to 0.0500%, Ca: 0 to 0.050%, Zr: 0 to 0.050%, and Y: 0 to 0.050%, La: 0 to 0.050%, and Ce: 0 to 0.050% and other REM (rare earth metals). The contents of these elements may also be respectively 0.0001% or more or 0.001% or more.

At the sheet thickness center part according to this embodiment of the present invention, the balance other than the above elements is comprised of Fe and impurities. "Impurities" are constituents, etc., mixed in due to various factors of the production process, first and foremost raw materials such as ore and scrap, etc., when industrially producing steel sheet or the sheet thickness center part.

(Preferable Chemical Compositions of First Surface Layer Part and Second Surface Layer Part)

In this embodiment of the present invention, it is sufficient that the first surface layer part and the second surface layer part have average Vickers hardnesses different from the sheet thickness center part and satisfy the previously explained relationship of the hardness cumulative value of the first surface layer part side and the hardness cumulative value of the second surface layer part side. For this reason, the chemical compositions of the first surface layer part and the second surface layer part are not particularly limited. However, in general, the chemical compositions of the first surface layer part and the second surface layer part can change in the contents of the specific alloy elements relating to the steel sheet strength in the case where the first surface layer part and second surface layer part have average Vickers hardnesses lower than the average Vickers hardness of the steel sheet ½ position (Embodiment 1) and the case where the first surface layer part and second surface layer part have average Vickers hardnesses higher than the average Vickers hardness of the steel sheet ½ position (Embodiment 2). Therefore, below, considering in particular the cases of Embodiments 1 and 2, preferable chemical compositions of the first surface layer part and second surface layer part will be explained.

(Embodiment 1: Case Where First Surface Layer Part and Second Surface Layer Part Have Average Vickers Hardnesses Lower Than Average Vickers Hardness of Sheet Thickness ½ Position)

(Contents of C of First Surface Layer Part and Second Surface Layer Part Are 0.9 Time or Less of Content of C of Sheet Thickness Center Part)

C is an element contributing to improvement of strength. Therefore, in Embodiment 1, the contents of C of the first and second surface layer parts are preferably 0.9 time or less of the content of C of the sheet thickness center part and may be 0.7 time or less, 0.5 time or less, 0.3 time or less, or 0.1 time or less. If the contents of C of the first and second surface layer parts are 0.9 time the content of C of the sheet thickness center part, since the upper limit of the content of C at the preferable chemical composition of the sheet thickness center part is 0.800% or less, the upper limits of the contents of C of the first and second surface layer parts become 0.720% or less. The contents of C of the first and second surface layer parts may also be 0.500% or less, 0.300% or less, 0.100% or less, or 0.010% or less. The lower limits are not particularly prescribed, but generally the contents of C are 0.001% or more and may be 0.005% or more.

(Sums of Contents of Mn, Cr, and Mo of First Surface Layer Part and Second Surface Layer Part of 0.9 Time or Less of Sum of Contents of Mn, Cr, and Mo of Sheet Thickness Center Part)

Similarly, Mn, Cr, and Mo are elements contributing to improvement of strength. Therefore, in Embodiment 1, the sums of the contents of Mn, Cr, and Mo of the first and second surface layer parts are preferably 0.9 time or less of the sum of the contents of Mn, Cr, and Mo of the sheet thickness center part and may also be 0.7 time or less, 0.5 time or less, or 0.3 time or less. The lower limits of the elements are not particularly prescribed, but generally the contents of Mn are 0.005% or more and the contents of Cr and Mo are 0.0005% or more and may be 0.001% or more.

(Contents of B of First Surface Layer Part and Second Surface Layer Part of 0.9 Time or Less of Content of B at Sheet Thickness Center Part)

Similarly, B is an element contributing to improvement of strength. Therefore, in Embodiment 1, the contents of B of the first and second surface layer parts are preferably 0.9 time or less of the content of B of the sheet thickness center part and may be 0.7 time or less, 0.5 time or less, or 0.3 time or less. The lower limits are not particularly prescribed, but generally the contents of B are 0.0001% or more and may preferably be 0.0003% or more.

(Sums of Contents of Cu and Ni of First Surface Layer Part and Second Surface Layer Part of 0.9 Time or Less of Sum of Contents of Cu and Ni of Sheet Thickness Center Part)

Similarly, Cu and Ni are elements contributing to improvement of strength. Therefore, in Embodiment 1, the sums of the contents of Cu and Ni of the first and second surface layer parts preferably are 0.9 time or less of the sum of the contents of Cu and Ni of the sheet thickness center part and may be 0.7 time or less, 0.5 time or less, or 0.3 time or less. The lower limits of the elements are not particularly prescribed, but generally the contents of Cu and Ni are respectively 0.0005% or more and may be 0.001% or more.

In Embodiment 1, the chemical compositions of the first surface layer part and second surface layer part need only be prescribed as to the contents of C of the first surface layer part and second surface layer part, the sum of the contents of Mn, Cr, and Mo, the contents of B, and/or the sums of the contents of Cu and Ni with respect to the contents of the corresponding elements of the sheet thickness center part. Therefore, the contents of the other elements are not particularly limited, but preferably may be contents similar to the case of the sheet thickness center part. Accordingly, examples of the chemical compositions of the first surface layer part and second surface layer part are as follows:

The first surface layer part and the second surface layer part respectively independently
have chemical compositions comprising, by mass %,
C: 0.720% or less,
Si: 0.01 to 3.00%,
Mn: 10.00% or less or 0.01 to 10.00%,
Al: 0 to 0.500% or 0.001 to 0.500%,
P: 0.100% or less,
S: 0.050% or less,
N: 0.0100% or less,
Cr: 0 to 3.000%,
Mo: 0 to 1.000%,
B: 0 to 0.0100%,
Ti: 0 to 0.500%,
Nb: 0 to 0.500%,
V: 0 to 0.500%,
Cu: 0 to 0.500%,
Ni: 0 to 0.500%,
O: 0 to 0.0200%,
W: 0 to 0.100%,
Ta: 0 to 0.100%,
Co: 0 to 0.500%,
Sn: 0 to 0.050%,
Sb: 0 to 0.050%,
As: 0 to 0.050%,
Mg: 0 to 0.0500%,
Ca: 0 to 0.050%,
Y: 0 to 0.050%,
Zr: 0 to 0.050%,
La: 0 to 0.050%,
Ce: 0 to 0.050%, and
balance: Fe and impurities, where the contents of C of the first surface layer part and second surface layer part are 0.9 time or less of the content of C of the sheet thickness center part. In addition, the sums of the contents of Mn, Cr, and Mo of the first surface layer part and the second surface layer part may be 0.9 time or less of the sum of the contents of Mn, Cr, and Mo of the sheet thickness center part, the contents of B of the first surface layer part and the second surface layer part may be 0.9 time or less of the content of B of the sheet thickness center part, and/or the sums of the contents of Cu and Ni of the first surface layer part and the second surface layer part may be 0.9 time or less of the sum of the contents of Cu and Ni of the sheet thickness center part.

(Embodiment 2: Case Where First Surface Layer Part and Second Surface Layer Part Have Average Vickers Hardnesses Higher Than Average Vickers Hardness of Sheet Thickness ½ Position)

(Contents of C of First Surface Layer Part and Second Surface Layer Part of 1.1 Times or More of Content of C of Sheet Thickness Center Part)

C is an element contributing to improvement of strength. Therefore, in Embodiment 2, the contents of C of the first and second surface layer part are preferably 1.1 times or more of the sheet thickness center part and may be 1.2 times or more, 1.3 times or more, 1.5 times or more, or 1.8 times or more. If the contents of C of the first and second surface layer parts are 1.1 times of the content of C of the sheet thickness center part, since the lower limit of the content of C at the preferable chemical composition of the sheet thickness center part is 0.050% or more, the lower limits of the contents of C of the first and second surface layer parts become 0.055% or more. The contents of C of the first and second surface layer parts may also be 0.300% or more, 0.500% or more, or 0.880% or more. The upper limits are not particularly prescribed, but generally the contents of C are 1.000% or less.

(Sums of Contents of Mn, Cr, and Mo of First Surface Layer Part and Second Surface Layer Part of 1.1 Times or More of Sum of Contents of Mn, Cr, and Mo of Sheet Thickness Center Part)

Similarly, Mn, Cr, and Mo are elements contributing to improvement of strength. Therefore, in Embodiment 2, the sums of the contents of Mn, Cr, and Mo of the first and second surface layer parts are preferably 1.1 times or more of the sum of the contents of Mn, Cr, and Mo of the sheet thickness center part and may be 1.2 times or more, 1.3 times or more or 1.5 times or more. The upper limits of the elements are not particularly prescribed, but generally the contents of Mn are 11.00% or less, the contents of Cr are 3.500% or less, and the contents of Mo are 1.500% or less.

(Contents of B of First Surface Layer Part and Second Surface Layer Part of 1.1 Times or More of Content of B of Sheet Thickness Center Part)

Similarly, B is an element contributing to improvement of strength. Therefore, in Embodiment 2, the contents of B of the first and second surface layer parts are preferably 1.1 times or more of the content of B of the sheet thickness center part and may be 1.2 times or more, 1.3 times or more, or 1.5 times or more. The upper limits are not particularly limited, but generally the contents of B are 0.0110% or less.

(Sums of Contents of Cu and Ni of First Surface Layer Part and Second Surface Layer Part of 1.1 Times or More of Sum of Contents of Cu and Ni of Sheet Thickness Center Part)

Similarly, Cu and Ni are elements contributing to improvement of strength. Therefore, in Embodiment 2, the sums of contents of Cu and Ni of the first and second surface layer parts are preferably 1.1 times or more of the sum of contents of Cu and Ni of the sheet thickness center part and may also be 1.2 times or more, 1.3 times or more, or 1.5 times or more. The upper limits of the elements are not particularly limited, but generally the contents of Cu and Ni are respectively 1.000% or less and may also be 0.700% or less.

In Embodiment 2, in the chemical compositions of the first surface layer part and the second surface layer part, it is sufficient to prescribe the contents of C of the first surface layer part and second surface layer part, the sums of the contents of Mn, Cr, and Mo, the contents of B, and/or the sums of the contents of Cu and Ni with respect to the contents of corresponding elements of the sheet thickness center part. Therefore, the contents of the other elements are not particularly limited, but preferably are the same as the case of the sheet thickness center part. Accordingly, examples of the preferable chemical compositions of the first surface layer part and second surface layer part are as follows:

The first surface layer part and the second surface layer part respectively independently have chemical compositions comprising, by mass %, C: 0.055 to 1.000%,
Si: 0.01 to 3.00%,
Mn: 0.01 to 11.00%,
Al: 0 to 0.500% or 0.001 to 0.500%,
P: 0.100% or less,
S: 0.050% or less,
N: 0.0100% or less,
Cr: 0 to 3.500%,
Mo: 0 to 1.500%,
B: 0 to 0.0110%,
Ti: 0 to 0.500%,
Nb: 0 to 0.500%,
V: 0 to 0.500%,
Cu: 0 to 1.000%,
Ni: 0 to 1.000%,
O: 0 to 0.0200%,
W: 0 to 0.100%,
Ta: 0 to 0.100%,
Co: 0 to 0.500%,
Sn: 0 to 0.050%,
Sb: 0 to 0.050%,
As: 0 to 0.050%,
Mg: 0 to 0.0500%,
Ca: 0 to 0.050%,
Y: 0 to 0.050%,
Zr: 0 to 0.050%,
La: 0 to 0.050%,
Ce: 0 to 0.050%, and
balance: Fe and impurities, where the contents of C of the first surface layer part and the second surface layer part are 1.1 times or more of the content of C of the sheet thickness center part. In addition, the sums of the contents of Mn, Cr, and Mo of the first surface layer part and the second surface layer part may be 1.1 times or more of the sum of the contents of Mn, Cr, and Mo of the sheet thickness center part, the contents of B of the first surface layer part and the second surface layer part may be 1.1 times or less of the content of B of the sheet thickness center part, and/or the sums of the contents of Cu and Ni of the first surface layer part and the second surface layer part may be 1.1 times or more of the sum of the contents of Cu and Ni of the sheet thickness center part.

In both of Embodiments 1 and 2, "impurities" are constituents, etc., mixed in due to various factors of the production process, first and foremost raw materials such as ore and scrap, etc., when industrially producing steel sheet or the first and second surface layer parts of the same.

In the above embodiments, the case where both of the first surface layer part and the second surface layer part have average Vickers hardnesses lower than the average Vickers hardness of the sheet thickness ½ position (Embodiment 1) or have average Vickers hardnesses higher than the average Vickers hardness of the sheet thickness ½ position (Embodiment 2) were explained, but, for example, the first surface layer part may also have a chemical composition corresponding to the Embodiment 2 and the second surface layer part may also have a chemical composition corresponding to the Embodiment 1.

(Tensile Strength)

The steel sheet according to one embodiment of the present invention can have any suitable tensile strength. While not particularly limited, for example, preferably it has a tensile strength of 980 MPa or more. The fact that high strength steel is particularly susceptible to hydrogen embrittlement is generally known. Therefore, if the steel sheet according to one embodiment of the present invention has a 980 MPa or more high tensile strength, compared with the case of shearing conventional steel sheet having the same tensile strength, the effect of reduction of the tensile residual stress occurring at the sheared edge is remarkable. Accordingly, the improvement of the hydrogen embrittlement reaction becomes particularly remarkable. Further, if shearing high strength steel sheet, the tensile residual stress occurring at the sheared edge generally becomes greater compared with the case of steel sheet having a relatively low tensile strength. However, the steel sheet according to one embodiment of the present invention can sufficiently reduce the tensile residual stress occurring at the sheared edge at the time of shearing even when having a tensile strength greatly more than 980 MPa. For example, in an embodiment of the present invention, the tensile strength of the steel sheet may be 1080 MPa or more, 1180 MPa or more, 1250 MPa or more, 1300 MPa or more, or 1470 MPa or more. The upper limit is not particularly set, but, for example, the tensile strength of the steel sheet may also be 2500 MPa or less, 2200 MPa or less, or 2000 MPa or less. The tensile strength is measured by obtaining a JIS No. 5 tensile test piece from a direction of the steel sheet perpendicular to the rolling direction 3and performing a tensile test based on JIS Z2241 (2011).

(Sheet Thickness)

The steel sheet according to one embodiment of the present invention, while not particularly limited, generally has a sheet thickness of 6.0 mm or less, more specifically 0.5 to 6.0 mm. By making the sheet thickness of the steel sheet a 6.0 mm or less or other sheet thickness more suitable for shearing, the effect of reduction of the tensile residual stress occurring at the sheared edge can be made more remarkable. For example, the sheet thickness may be 1.0 mm or more or 1.2 mm or more or 2.0 mm or more and/or may be 5.5 mm or less, 5.0 mm or less, 4.5 mm or less, 4.0 mm or less, or 3.0 mm or less.

(Plating)

It is also possible to form a plating layer at least at one surface of the first surface layer part and second surface layer part of the steel sheet according to one embodiment of the present invention for the purpose of improving the corrosion resistance. The plating layer may be either of an electroplating layer and hot dip coating layer. An electroplating layer includes, for example, an electrogalvanization layer, electro Zn—Ni alloy plating layer, etc. A hot dip coating layer includes, for example, a hot dip galvanization layer, hot dip galvannealing layer, hot dip aluminum coating layer, hot dip Zn—Al alloy coating layer, hot dip Zn—Al—Mg alloy coating layer, hot dip Zn—Al—Mg—Si alloy coating layer, etc. The amount of deposition of the plating layer is not particularly limited and may be a general amount of deposition.

<Method of Production of Steel Sheet>

The steel sheet according to one embodiment of the present invention, for example, can be produced by any known suitable method. While not particularly limited, for example, the steel sheet according to one embodiment of the present invention can be produced using the cladding method. In this case, the method of production of the steel sheet may further include a stacking step for stacking two surface-layer use steel materials for forming a first surface layer part and second surface layer part at the two sides of a base steel material for forming the sheet thickness center part so as to form a multi-layer steel material, a hot rolling step for hot rolling the obtained stacked steel materials, and a cooling step for cooling the hot rolled multi-layer steel material and, in accordance with need, a coiling step, cold rolling step, annealing step, plating step, etc.

In the stacking step, for example, it is possible to form a multi-layer steel material by stacking two surface-layer use steel materials for forming the first surface layer part and second surface layer part having chemical compositions explained above on the two sides of a base material steel sheet for forming the sheet thickness center part having the chemical composition explained above and degreased on its surface and joining them by arc welding, etc. At that time, it is also possible to change the contents of some of the elements of the chemical composition between the two surface-layer use steel materials (for example, in particular the contents of at least one element such as C, Mn, Cr, Mo, B, Cu, Ni, etc., relating to the steel sheet strength) so that the hardness cumulative value of the first surface layer part of the finally obtained steel sheet becomes 1.05 times or more of the hardness cumulative value of the second surface layer part. In place of this or in addition to this, it is possible to change the thicknesses of the two surface layer-use steel materials, specifically, if the first surface layer part and second surface layer part have average Vickers hardnesses lower than the average Vickers hardness of the sheet thickness ½ position, to make the surface layer-use steel material for forming the first surface layer part thinner than the surface layer-use steel material for forming the second surface layer part, so that similarly the hardness cumulative value of the first surface layer part of the finally obtained steel sheet becomes 1.05 times or more of the hardness cumulative value of the second surface layer part.

At the hot rolling step, first the multi-layer steel material generally is heated to a 1100 to 1350° C. temperature, next the hot rolling is performed under conditions giving a completion temperature of hot rolling of 800° C. or more. If the completion temperature of hot rolling is too low, the rolling reaction force becomes higher and it becomes difficult to stably obtain the desired sheet thickness. Aside from this, the specific conditions of the steps are not particularly limited. Suitable conditions may be suitably selected in accordance with the type of steel, application of the steel sheet, desired characteristics, etc. For example, to form low temperature transformed structures in the base steel material to obtain high strength steel sheet, the coiling temperature at the coiling step may be made a relatively low temperature, more specifically 600° C. or less, in particular 400° C. or less.

The steel sheet according to one embodiment of the present invention, as explained above, is excellent in the effect of reduction of the tensile residual stress occurring at the sheared edge at the time of shearing and therefore is suitable for application to shearing (i.e., used as steel sheet for shearing use). In shearing, generally it is preferable to perform cutting while placing the first surface layer part of the steel sheet at the punch side and the second surface layer part of the steel sheet at the die side. Due to this, it is possible to reduce the tensile residual stress occurring at the sheared edge of the targeted workpiece by the crack growing from the first surface layer part of the punch side and as a result to remarkably improve the hydrogen embrittlement resistance of the sheared edge at the workpiece. On the other hand, if performing cutting while placing the first surface layer part of the steel sheet at the die side and the second surface layer part of the steel sheet at the punch side, it is possible to reduce the tensile residual stress occurring at the sheared edge of the scrap by the crack growing from the first surface layer part of the die side. Therefore, in such a case, it is possible to utilize the obtained scrap for some sort of product.

Below, examples will be used to explain the present invention in more detail, but the present invention is not limited to these examples in any way.

EXAMPLES

In this example, first, a continuously cast slab (base steel material) of a sheet thickness of 20 mm having the chemical composition shown in Table 1 was degreased on its surface, then surface layer-use steel materials of predetermined thicknesses having the chemical compositions shown in Table 1 were arranged at the two sides and joined by arc welding so as to obtain a multi-layer steel material. Next, this multi-layer steel material was heated to a predetermined temperature of 1100 to 1350° C. in range and was hot rolled under conditions giving a completion temperature of hot rolling of 800° C. or more, then the sheet was coiled at a 600° C. or less temperature to obtain a hot rolled steel sheet of a sheet thickness of about 2.4 mm. Next, the hot rolled steel sheet was pickled, then was cold rolled to obtain the sheet thickness shown in Table 2, and finally was annealed by holding it a 600° C. or more suitable temperature for a predetermined time to obtain a cold rolled steel sheet. A sample taken from the obtained cold rolled steel sheet was analyzed for the chemical composition of the parts corresponding to the sheet thickness center part, first surface layer part, and second surface layer part (respectively, the sheet thickness ½ position, 2% position of sheet thickness from one surface, and 2% position of sheet thickness from other surface) whereupon there was substantially no change from the chemical compositions of the base steel material and the first and second surface layer-use steel materials shown in Table 1.

TABLE 1

| Steel type | Base steel material (mass %, balance: Fe and impurities) | | | | | | | | | | | | | |
|---|---|---|---|---|---|---|---|---|---|---|---|---|---|---|
| | C | Si | Mn | Al | P | S | N | Cr | Mo | B | Ti | Nb | V | Cu |
| a | 0.240 | 0.52 | 1.71 | 0.031 | 0.008 | 0.005 | 0.0003 | — | — | — | — | — | — | — |
| b | 0.240 | 0.52 | 1.71 | 0.031 | 0.008 | 0.005 | 0.0003 | — | — | — | — | — | — | — |
| c | 0.182 | 1.02 | 2.26 | 0.030 | 0.009 | 0.009 | 0.0003 | — | — | — | — | — | — | — |
| d | 0.240 | 0.52 | 1.71 | 0.031 | 0.008 | 0.005 | 0.0003 | — | — | — | — | — | — | — |
| e | 0.240 | 0.52 | 1.71 | 0.031 | 0.008 | 0.005 | 0.0003 | — | — | — | — | — | — | 0.230 |
| f | 0.326 | 0.38 | 1.41 | 0.028 | 0.010 | 0.003 | 0.0002 | 0.010 | 0.160 | 0.0020 | — | — | — | — |
| g | 0.182 | 1.02 | 2.26 | 0.030 | 0.009 | 0.009 | 0.0003 | — | — | — | 0.022 | 0.030 | 0.120 | — |
| h | 0.246 | 0.38 | 2.01 | 0.028 | 0.007 | 0.003 | 0.0003 | — | — | — | — | — | — | — |

| Steel type | Base steel material (mass %, balance: Fe and impurities) | | | | | | | | | | | | |
|---|---|---|---|---|---|---|---|---|---|---|---|---|---|
| | Ni | O | W | Ta | Co | Sn | Sb | As | Mg | Ca | Y | Zr | La | Ce |
| a | — | — | — | — | — | — | — | — | — | — | — | — | — | — |
| b | — | — | — | — | — | — | — | — | — | — | — | — | — | — |
| c | — | — | — | — | — | — | — | — | — | — | — | — | — | — |
| d | — | — | — | — | — | — | — | — | — | — | — | — | — | — |
| e | 0.150 | — | — | — | — | — | — | — | — | — | — | — | — | — |
| f | — | — | — | — | — | — | — | — | — | — | — | — | — | — |
| g | — | — | — | — | — | — | — | — | — | — | — | — | — | — |
| h | — | 0.001 | 0.033 | 0.002 | 0.036 | 0.011 | 0.021 | 0.005 | 0.010 | 0.006 | 0.001 | 0.001 | 0.001 | 0.012 |

| Steel type | First surface layer-use steel material (mass %, balance: Fe and impurities) | | | | | | | Second surface layer-use steel material (mass %, balance: Fe and impurities) | | | | | | |
|---|---|---|---|---|---|---|---|---|---|---|---|---|---|---|
| | C | Si | Mn | Al | P | S | N | C | Si | Mn | Al | P | S | N |
| a | 0.008 | 0.01 | 0.21 | — | 0.007 | 0.007 | 0.003 | 0.008 | 0.01 | 0.21 | — | 0.007 | 0.007 | 0.003 |
| b | 0.110 | 0.23 | 0.17 | — | 0.002 | 0.001 | 0.003 | 0.008 | 0.01 | 0.21 | — | 0.007 | 0.007 | 0.003 |
| c | 0.360 | 0.21 | 0.49 | — | 0.007 | 0.003 | 0.003 | 0.301 | 0.57 | 1.78 | 0.022 | 0.008 | 0.004 | 0.004 |
| d | 0.301 | 0.57 | 1.78 | 0.022 | 0.008 | 0.004 | 0.004 | 0.008 | 0.01 | 0.21 | — | 0.007 | 0.007 | 0.003 |
| e | 0.110 | 0.23 | 0.17 | — | 0.002 | 0.001 | 0.003 | 0.110 | 0.23 | 0.17 | — | 0.002 | 0.001 | 0.003 |
| f | 0.008 | 0.01 | 0.21 | — | 0.007 | 0.007 | 0.003 | 0.008 | 0.01 | 0.21 | — | 0.007 | 0.007 | 0.003 |
| g | 0.008 | 0.01 | 0.21 | — | 0.007 | 0.007 | 0.003 | 0.008 | 0.01 | 0.21 | — | 0.007 | 0.007 | 0.003 |
| h | 0.008 | 0.01 | 0.21 | — | 0.007 | 0.007 | 0.003 | 0.008 | 0.01 | 0.21 | — | 0.007 | 0.007 | 0.003 |

The characteristics of the obtained cold rolled steel sheet were measured and evaluated by the following methods.

[Thicknesses of First Surface Layer Part and Second Surface Layer Part]

The thicknesses of the first surface layer part and the second surface layer part were determined by an optical microscope. The sample being measured was buried in a diameter 30 mm cylindrical epoxy resin, roughly polished by wet polishing using #80 to 1000 polishing paper, then polished to a mirror finish using diamond abrasives having average particle sizes of 3 μm and 1 μm. The polishing using the diamond abrasive having an average particle size of 1 μm was performed under conditions of application of a load of 1N to 10N and holding for 30 to 600 seconds on a polishing table rotating at a speed of 30 to 120 mpm. The step difference formed the interface of the sheet thickness center part and each surface layer part in this polishing was examined under an optical microscope so as to determine the interface of the sheet thickness center part and the surface layer part and determine the thicknesses of the first surface layer part and second surface layer part (%, ratios in sheet thickness).

[Average Vickers Hardnesses of Sheet Thickness ½ Position, First Surface Layer Part, and Second Surface Layer Part]

The Vickers hardnesses of 10 points were randomly measured by a pressing force of 100 g within the above defined first surface layer part and second surface layer part and the average value of these was calculated to determine the average Vickers hardnesses of the first surface layer part and the second surface layer part. Similarly, the Vickers hardnesses of a total of 5 points were measured by a pressing force of 100 g in a direction vertical to the sheet thickness at the sheet thickness ½ position and on a line parallel to the rolling direction and the average value of these was calculated to determine the average Vickers hardness of the sheet thickness ½ position.

[First Hardness Cumulative Value and Second Hardness Cumulative Value]

First, in the sheet thickness direction from the surface of the first surface layer part side of the steel sheet, the Vickers hardnesses at different sheet thickness direction positions were measured by a pressing load of 100 g at intervals of 50 μm in the sheet thickness direction starting from the 15 μm position as the starting point of measurement, then the Vickers hardnesses of a total of 5 points were similarly measured by a pressing force of 100 g in a direction vertical to the sheet thickness at those positions and on a line parallel to the rolling direction. The average values of these are made the average Vickers hardnesses at those sheet thickness direction positions. The intervals between the measurement points aligned in the sheet thickness direction and the rolling direction were a distance of 4 times or more of the indentations. If difficult to make the intervals of the measurement points a distance of 4 times or more of the indentations while striking the surface in the sheet thickness direction in a line, the intervals of the measurement points were made a distance of 4 times or more of the indentations while striking the surface in the sheet thickness direction in a zigzag pattern. The first hardness cumulative value (Hv×mm) was determined by adding up the values of the average Vickers hardnesses at the sheet thickness direction positions obtained by measurement from the surface of the first surface layer part side to 30% of the sheet thickness multiplied with the measurement intervals. Similarly, the second hardness cumulative value (Hv×mm) was determined by adding up the values of the average Vickers hardnesses at the sheet thickness direction positions obtained by measurement from the surface of the second surface layer part side to 30% of the sheet thickness multiplied with the measurement intervals.

[Relationship of Ratio P ($H_{high}/H_{low}$) and Formula 1]

In the process of determining the first hardness cumulative value and the second hardness cumulative value explained above, the ratios P ($H_{high}/H_{low}$) of the hardness cumulative values at the different sheet thickness direction positions up to 30% of the sheet thickness at the first surface layer part side and the second surface layer part side were calculated and the calculated ratios of cumulative values were plotted. The curve was compared with the curve of the following formula 1 to judge whether the ratio P satisfies the above formula 1. The case of satisfying formula 1 was judged as OK (okay) and the case of not satisfying was judged as NG (no good).

$$P \geq 0.00035(X-30)^2 + 1.05 \qquad \text{formula 1}$$

where, $0 < X \leq 30$.

[Tensile Strength]

The tensile strength was measured by obtaining a JIS No. 5 tensile test piece from a direction perpendicular to the rolling direction of the cold rolled steel sheet and subjecting it to a tensile test based on JIS Z2241 (2011).

[Tensile Residual Stress]

Cold rolled steel sheet was sheared and the tensile residual stress occurring at the sheared edge of the cold rolled steel sheet was measured. Specifically, the first surface layer part of the cold rolled steel sheet is arranged at the punch side and the second surface layer part of the cold rolled steel sheet at the die side and the punch and the die are made to relatively move to stamp the cold rolled steel sheet by the punch and obtain a workpiece having a sheared edge on the die. Next, at the center position of the workpiece in the sheet thickness direction (corresponding to fracture surface), the residual stress was measured by X-rays by a spot diameter of φ500 μm (three different locations in the sheet width direction). The measurement directions of the residual stress were made the three directions of the sheet thickness direction, sheet width direction, and the direction of 45 degrees from the sheet thickness. The $\sin^2 \psi$ method was used for calculation of the residual stress. The residual stress in the end face normal direction was assumed to be zero and the maximum main stress was calculated from the residual stress in three directions calculated. The tensile residual stress of each workpiece was determined by averaging the values of the maximum main stresses calculated at three locations. The case where the ratio of the tensile residual stress and the tensile strength (tensile residual stress/tensile strength) was 0.90 or less was evaluated as steel sheet able to reduce the tensile residual stress occurring at the sheared edge at the time of shearing. The obtained results are shown in Table 2.

TABLE 3

Table 2

| | | | Thickness (% is ratio with sheet thickness) | | | | Average Vickers hardness (Hv) | | |
|---|---|---|---|---|---|---|---|---|---|
| Class | No. | Steel type | Sheet thickness (mm) | First surface layer part (%) | | Second surface layer part (%) | | Sheet thickness ½ part | First surface layer part | Second surface layer part |
| | | | | (%) | (μm) | (%) | part | | | |
| Inv. ex. | 1 | a | 1.6 | 7 | 112 | 23 | 368 | 461 | 136 | 119 |
| Inv. ex. | 2 | a | 1.6 | 6 | 96 | 12 | 192 | 451 | 126 | 121 |
| Comp. ex. | 3 | a | 1.6 | 8 | 128 | 8 | 128 | 458 | 127 | 123 |
| Inv. ex. | 4 | b | 1.6 | 5 | 80 | 8 | 128 | 446 | 237 | 116 |
| Comp. ex. | 5 | b | 1.6 | 5 | 80 | 5 | 80 | 463 | 251 | 131 |
| Inv. ex. | 6 | c | 1.6 | 27 | 432 | 21 | 336 | 401 | 534 | 481 |
| Inv. ex. | 7 | c | 1.6 | 23 | 368 | 27 | 432 | 398 | 551 | 486 |
| Comp. ex. | 8 | c | 1.6 | 7 | 112 | 29 | 464 | 407 | 528 | 492 |
| Inv. ex. | 9 | d | 1.6 | 4 | 64 | 5 | 80 | 476 | 485 | 119 |
| Inv. ex. | 10 | e | 1.4 | 5 | 70 | 15 | 210 | 472 | 124 | 121 |
| Inv. ex. | 11 | e | 1.4 | 4 | 56 | 8 | 112 | 472 | 127 | 127 |
| Comp. ex. | 12 | e | 1.4 | 16 | 224 | 15 | 210 | 468 | 124 | 123 |
| Inv. ex. | 13 | f | 1.2 | 7 | 84 | 18 | 216 | 541 | 122 | 121 |
| Comp. ex. | 14 | f | 1.2 | 5 | 60 | 5 | 60 | 552 | 118 | 115 |
| Inv. ex. | 15 | g | 2.0 | 6 | 120 | 21 | 420 | 351 | 124 | 119 |
| Inv. ex. | 16 | g | 2.0 | 6 | 120 | 10 | 200 | 361 | 126 | 124 |
| Comp. ex. | 17 | g | 2.0 | 12 | 240 | 12 | 240 | 368 | 127 | 125 |
| Inv. ex. | 18 | h | 1.6 | 8 | 128 | 24 | 384 | 472 | 118 | 121 |

| Class | No. | A First hardness cumulative value | B Second hardness cumulative value | A/B | Relation of ratio P and formula 1 | C Tensile strength (MPa) | D Tensile residual stress (MPa) | D/C |
|---|---|---|---|---|---|---|---|---|
| Inv. ex. | 1 | 203 | 156 | 1.30 | NG | 1476 | 1256 | 0.85 |
| Inv. ex. | 2 | 200 | 185 | 1.08 | NG | 1511 | 1289 | 0.85 |
| Comp. ex. | 3 | 195 | 192 | 1.02 | NG | 1507 | 1396 | 0.93 |
| Inv. ex. | 4 | 205 | 193 | 1.06 | OK | 1531 | 1089 | 0.71 |
| Comp. ex. | 5 | 213 | 207 | 1.03 | NG | 1526 | 1423 | 0.93 |
| Inv. ex. | 6 | 221 | 205 | 1.08 | NG | 1488 | 1195 | 0.80 |
| Inv. ex. | 7 | 222 | 210 | 1.06 | NG | 1527 | 1248 | 0.82 |
| Comp. ex. | 8 | 202 | 215 | 0.94 | NG | 1541 | 1729 | 1.12 |
| Inv. ex. | 9 | 226 | 214 | 1.06 | OK | 1503 | 1091 | 0.73 |
| Inv. ex. | 10 | 183 | 163 | 1.12 | NG | 1526 | 1203 | 0.79 |
| Inv. ex. | 11 | 185 | 176 | 1.05 | NG | 1541 | 1238 | 0.80 |
| Comp. ex. | 12 | 162 | 161 | 1.01 | NG | 1536 | 1521 | 0.99 |
| Inv. ex. | 13 | 179 | 149 | 1.20 | NG | 1780 | 1291 | 0.73 |
| Comp. ex. | 14 | 186 | 185 | 1.01 | NG | 1791 | 1702 | 0.95 |
| Inv. ex. | 15 | 198 | 161 | 1.23 | NG | 1236 | 991 | 0.80 |
| Inv. ex. | 16 | 202 | 192 | 1.05 | NG | 1203 | 1007 | 0.84 |
| Comp. ex. | 17 | 193 | 192 | 1.01 | NG | 1216 | 1326 | 1.09 |
| Inv. ex. | 18 | 203 | 149 | 1.36 | NG | 1516 | 1092 | 0.72 |

In Table 2, despite using the same type of steel, in some cases the values of the average Vickers hardness (Hv) differ (for example, the average Vickers hardness of the sheet thickness ½ position of Invention Example 1 using the steel type is 461Hv, while the average Vickers hardness of the sheet thickness ½ position of Invention Example 2 using the same type of steel is 451Hv), but these are due to production error and/or measurement error. In each of Comparative Examples 3, 5, 8, 12, 14, and 17, the first hardness cumulative value at the region from the surface of the first surface layer part side to 30% of sheet thickness was less than 1.05 times of the second hardness cumulative value at the region from the surface of the second surface layer part side to 30% of sheet thickness, therefore it was not possible to preferentially grow the crack from the first surface layer part of the punch side. As a result, it was not possible to sufficiently reduce the tensile residual stress occurring at the sheared edge of the workpiece.

In contrast to this, in Invention Examples 1, 2, 4, 6, 7, 9 to 11, 13, 15, 16, and 18, by controlling the first hardness cumulative value to become 1.05 times or more of the second hardness cumulative value, it was possible to preferentially grow a crack from the first surface layer part of the punch side and, as a result, possible to remarkably reduce the tensile residual stress occurring at the sheared edge of the workpiece.

REFERENCE SIGNS LIST 1 sheared edge
1a droop
1b fracture surface
1bx first part
1by second part
1c burr
1dx first crack 1dy second crack
1e sheared surface
5 steel sheet
10 workpiece
10a first surface
10b second surface
11 one part of steel sheet
12 other part of steel sheet
15 scrap
21 first blade
22 second blade

The invention claimed is:

1. A steel sheet comprising a sheet thickness center part and a first surface layer part and a second surface layer part respectively arranged at two sides of the sheet thickness center part, wherein
the first surface layer part and second surface layer part respectively independently have thicknesses of more than 10 μm to 30% or less of the sheet thickness,
the first surface layer part and second surface layer part have average Vickers hardnesses different from the average Vickers hardness of a sheet thickness 1/2 position, and
a first hardness cumulative value at a region from a surface of the first surface layer part side to 30% of the sheet thickness is 1.05 times or more of a second hardness cumulative value at a region from a surface of the second surface layer part side to 30% of the sheet thickness.

2. The steel sheet according to claim 1, wherein a ratio $P(H_{high}/H_{low})$ of a hardness cumulative value $H_{high}$ at a region from a surface of the first surface layer part side to X % of the sheet thickness and a hardness cumulative value $H_{low}$ at a region from a surface of the second surface layer part side to X % of the sheet thickness satisfies the following formula 1:

$$P \geq 0.00035(X-30)^2 \quad \text{formula 1}$$

where, $0 < X \leq 30$.

3. The steel sheet according to claim 2, wherein the first hardness cumulative value is 1.20 times or more of the second hardness cumulative value.

4. The steel sheet according to claim 2, wherein the first surface layer part and second surface layer part have average Vickers hardnesses lower than the average Vickers hardness of the sheet thickness 1/2 position.

5. The steel sheet according to claim 2, wherein the tensile strength is 980 MPa or more.

6. The steel sheet according to claim 2, wherein the sheet thickness center part has a chemical composition comprising, by mass %,
C: 0.050 to 0.800%,
Si: 0.01 to 3.00%,
Mn: 0.01 to 10.00%,
Al: 0.001 to 0.500%,
P: 0.100% or less,
S: 0.050% or less,
N: 0.0100% or less,
Cr: 0 to 3.000%,
Mo: 0 to 1.000%,
B: 0 to 0.0100%,
Ti: 0 to 0.500%,
Nb: 0 to 0.500%,
V: 0 to 0.500%,
Cu: 0 to 0.500%,
Ni: 0 to 0.500%,
O: 0 to 0.0200%,
W: 0 to 0.100%,
Ta: 0 to 0.100%,
Co: 0 to 0.500%,
Sn: 0 to 0.050%,
Sb: 0 to 0.050%,
As: 0 to 0.050%,
Mg: 0 to 0.0500%,
Ca: 0 to 0.050%,
Y: 0 to 0.050%,
Zr: 0 to 0.050%,
La: 0 to 0.050%,
Ce: 0 to 0.050%, and
balance: Fe and impurities.

7. The steel sheet according to claim 1, wherein the first hardness cumulative value is 1.20 times or more of the second hardness cumulative value.

8. The steel sheet according to claim 7, wherein the first surface layer part and second surface layer part have average Vickers hardnesses lower than the average Vickers hardness of the sheet thickness 1/2 position.

9. The steel sheet according to claim 2, wherein the first surface layer part and second surface layer part have average Vickers hardnesses higher than the average Vickers hardness of the sheet thickness 1/2 position.

10. The steel sheet according to claim 7, wherein the first surface layer part and second surface layer part have average Vickers hardnesses higher than the average Vickers hardness of the sheet thickness 1/2 position.

11. The steel sheet according to claim 7, wherein the tensile strength is 980 MPa or more.

12. The steel sheet according to claim 7, wherein the sheet thickness center part has a chemical composition comprising, by mass %,
C: 0.050 to 0.800%,
Si: 0.01 to 3.00%,
Mn: 0.01 to 10.00%,
Al: 0.001 to 0.500%,
P: 0.100% or less,
S: 0.050% or less,
N: 0.0100% or less,
Cr: 0 to 3.000%,
Mo: 0 to 1.000%,
B: 0 to 0.0100%,
Ti: 0 to 0.500%,
Nb: 0 to 0.500%,
V: 0 to 0.500%,
Cu: 0 to 0.500%,
Ni: 0 to 0.500%,
O: 0 to 0.0200%,
W: 0 to 0.100%,
Ta: 0 to 0.100%,
Co: 0 to 0.500%,
Sn: 0 to 0.050%,
Sb: 0 to 0.050%,
As: 0 to 0.050%,
Mg: 0 to 0.0500%,
Ca: 0 to 0.050%,
Y: 0 to 0.050%,
Zr: 0 to 0.050%,
La: 0 to 0.050%,
Ce: 0 to 0.050%, and
balance: Fe and impurities.

13. The steel sheet according to claim 1, wherein the first surface layer part and second surface layer part have average Vickers hardnesses lower than the average Vickers hardness of the sheet thickness 1/2 position.

14. The steel sheet according to claim 13, wherein the tensile strength is 980 MPa or more.

15. The steel sheet according to claim 1, wherein the first surface layer part and second surface layer part have average Vickers hardnesses higher than the average Vickers hardness of the sheet thickness 1/2 position.

16. The steel sheet according to claim 15, wherein the tensile strength is 980 MPa or more.

17. The steel sheet according to claim 1, wherein the tensile strength is 980 MPa or more.

18. The steel sheet according to claim 17, wherein the tensile strength is 1470 MPa or more.

19. The steel sheet according to claim 1, wherein the sheet thickness center part has a chemical composition comprising, by mass %,
C: 0.050 to 0.800%,
Si: 0.01 to 3.00%,
Mn: 0.01 to 10.00%,
Al: 0.001 to 0.500%,
P: 0.100% or less,
S: 0.050% or less,
N: 0.0100% or less,
Cr: 0 to 3.000%,
Mo: 0 to 1.000%,
B: 0 to 0.0100%,
Ti: 0 to 0.500%,
Nb: 0 to 0.500%,
V: 0 to 0.500%,
Cu: 0 to 0.500%,
Ni: 0 to 0.500%,
O: 0 to 0.0200%,
W: 0 to 0.100%,
Ta: 0 to 0.100%,
Co: 0 to 0.500%,
Sn: 0 to 0.050%,
Sb: 0 to 0.050%,
As: 0 to 0.050%,
Mg: 0 to 0.0500%,
Ca: 0 to 0.050%,
Y: 0 to 0.050%,
Zr: 0 to 0.050%,
La: 0 to 0.050%,
Ce: 0 to 0.050%, and
balance: Fe and impurities.

20. The steel sheet according to claim 19, wherein the chemical composition comprises, by mass %, at least one of:
Cr: 0.001 to 3.000%,
Mo: 0.001 to 1.000%,
B: 0.0001 to 0.0100%,
Ti: 0.001 to 0.500%,
Nb: 0.001 to 0.500%,
V: 0.001 to 0.500%,
Cu: 0.001 to 0.500%,
Ni: 0.001 to 0.500%,
O: 0.0001 to 0.0200%,
W: 0.001 to 0.100%,
Ta: 0.001 to 0.100%,
Co: 0.001 to 0.500%,
Sn: 0.001 to 0.050%,
Sb: 0.001 to 0.050%,
As: 0.001 to 0.050%,
Mg: 0.0001 to 0.0500%,
Ca: 0.001 to 0.050%,
Y: 0.001 to 0.050%,
Zr: 0.001 to 0.050%,
La: 0.001 to 0.050%, and
Ce: 0.001 to 0.050%.

* * * * *